US011644416B2

(12) United States Patent
O'Hara et al.

(10) Patent No.: US 11,644,416 B2
(45) Date of Patent: May 9, 2023

(54) PROTEIN SECONDARY STRUCTURE PREDICTION

(71) Applicant: NOTCO DELAWARE, LLC, Santiago (CL)

(72) Inventors: Nathan O'Hara, Santiago (CL); Adil Yusuf, Santiago (CL); Julia Christin Berning, Santiago (CL); Francisca Villanueva, Santiago (CL); Rodrigo Contreras, Santiago (CL); Isadora Nun, Santiago (CL); Aadit Patel, Santiago (CL); Karim Pichara, Santiago (CL)

(73) Assignee: NotCo Delaware, LLC, Santiago (CL)

( * ) Notice: Subject to any disclaimer, the term of this patent is extended or adjusted under 35 U.S.C. 154(b) by 195 days.

(21) Appl. No.: 17/180,599

(22) Filed: Feb. 19, 2021

(65) Prior Publication Data

US 2022/0136966 A1    May 5, 2022

Related U.S. Application Data

(63) Continuation of application No. 17/090,014, filed on Nov. 5, 2020, now Pat. No. 10,962,473.

(51) Int. Cl.
*G01N 21/35* (2014.01)
*G06N 5/04* (2023.01)
(Continued)

(52) U.S. Cl.
CPC .............. *G01N 21/35* (2013.01); *G06N 5/04* (2013.01); *G06N 20/00* (2019.01); *G01N 2021/3595* (2013.01); *G06Q 30/0201* (2013.01)

(58) Field of Classification Search
CPC .......... G01N 21/35; G01N 2021/3595; G06N 5/04; G06N 20/00; G06Q 30/0201
See application file for complete search history.

(56) References Cited

U.S. PATENT DOCUMENTS 5,305,076 A * 4/1994 Inoue .................... G01N 21/31
250/339.08
8,044,354 B2 * 10/2011 Werner ................. G01J 3/0272
250/341.1

(Continued)

FOREIGN PATENT DOCUMENTS

WO    2004083451 A1   9/2004
WO    WO 2004083451    9/2004

(Continued)

OTHER PUBLICATIONS

Cromwell et al., "Computational Creativity in the Culinary Arts", Proceedings of the Twenty-Eighth International Florida Artificial Intelligence Research Society Conference, dated 2015, 5 pages.

(Continued)

*Primary Examiner* — Tung S Lau
(74) *Attorney, Agent, or Firm* — Haverstock & Owens, A Law Corporation

(57) ABSTRACT

An artificial intelligence model receives a FTIR spectrum of a given ingredient to predict its protein secondary structure. The model includes three artificial modules, which generate three predicted values corresponding to structural categories (e.g., α-helix, β-sheet, and other) of the predicted secondary structure. Proteins may be compared for similarity based on predicted values corresponding to the structural categories of the predicted secondary structure.

20 Claims, 6 Drawing Sheets

(51) Int. Cl.
*G06N 20/00* (2019.01)
*G06Q 30/0201* (2023.01)

(56) References Cited

U.S. PATENT DOCUMENTS

| | | | |
|---|---|---|---|
| 8,419,433 | B2 | 4/2013 | Do et al. |
| 8,647,121 | B1 | 2/2014 | Witlin et al. |
| 8,775,341 | B1 | 7/2014 | Commons |
| 9,513,167 | B2* | 12/2016 | Hargreaves ............ G01J 3/4412 |
| 9,519,620 | B1 | 12/2016 | Pinel et al. |
| 9,841,897 | B2 | 12/2017 | Palmer et al. |
| 10,325,181 | B2 | 6/2019 | Xu et al. |
| 10,515,715 | B1 | 12/2019 | Pappas et al. |
| 10,915,818 | B1 | 2/2021 | Patel et al. |
| 10,957,424 | B1 | 3/2021 | Navon et al. |
| 10,962,473 | B1* | 3/2021 | O'Hara ................... G06N 20/00 |
| 10,970,621 | B1 | 4/2021 | Pichara et al. |
| 10,984,145 | B1 | 4/2021 | Hutchinson et al. |
| 10,993,465 | B2 | 5/2021 | Pichara et al. |
| 11,164,069 | B1 | 11/2021 | Korsunsky et al. |
| 11,164,478 | B2 | 11/2021 | Pichara et al. |
| 11,348,664 | B1 | 5/2022 | Kaneko et al. |
| 11,373,107 | B1 | 6/2022 | Clavero et al. |
| 11,404,144 | B1 | 8/2022 | Kang et al. |
| 2002/0184167 | A1 | 12/2002 | McClanahan |
| 2003/0157725 | A1 | 8/2003 | Franzen |
| 2004/0153250 | A1 | 8/2004 | Hurst et al. |
| 2005/0143936 | A1* | 6/2005 | Laughlin ............ G01N 21/3563 702/23 |
| 2007/0139667 | A1 | 6/2007 | Russell et al. |
| 2009/0055247 | A1 | 2/2009 | Jackson |
| 2011/0020518 | A1 | 1/2011 | Delort et al. |
| 2012/0082362 | A1 | 4/2012 | Diem et al. |
| 2012/0328178 | A1 | 12/2012 | Remiszewski et al. |
| 2013/0149679 | A1 | 6/2013 | Tokuda et al. |
| 2013/0221222 | A1 | 8/2013 | Baiz et al. |
| 2013/0222406 | A1 | 8/2013 | Wolfe et al. |
| 2016/0025569 | A1* | 1/2016 | Hargreaves ............ G01N 21/35 356/301 |
| 2016/0110584 | A1 | 4/2016 | Remiszewski |
| 2016/0358043 | A1 | 12/2016 | Mu et al. |
| 2017/0116517 | A1 | 4/2017 | Chee et al. |
| 2017/0139902 | A1 | 5/2017 | Byron et al. |
| 2017/0220558 | A1 | 8/2017 | Pinel et al. |
| 2017/0238590 | A1 | 8/2017 | Bansal-Mutalik et al. |
| 2017/0345185 | A1 | 11/2017 | Byron et al. |
| 2018/0101784 | A1 | 4/2018 | Rolfe et al. |
| 2018/0192680 | A1 | 7/2018 | Fraser et al. |
| 2018/0203921 | A1 | 7/2018 | Privault et al. |
| 2018/0293489 | A1 | 10/2018 | Eyster et al. |
| 2018/0357299 | A1 | 12/2018 | Miranda et al. |
| 2019/0171707 | A1 | 6/2019 | Rapaport |
| 2019/0200797 | A1 | 7/2019 | Diao et al. |
| 2019/0228855 | A1 | 7/2019 | Leifer et al. |
| 2019/0228856 | A1 | 7/2019 | Leifer et al. |
| 2019/0295440 | A1 | 9/2019 | Hadad |
| 2020/0268032 | A1 | 8/2020 | Okuyama |
| 2020/0309746 | A1 | 10/2020 | Sakai |
| 2020/0365053 | A1 | 11/2020 | Pichara |
| 2021/0027379 | A1 | 1/2021 | Zhu et al. |

FOREIGN PATENT DOCUMENTS

| | | | |
|---|---|---|---|
| WO | | 2013052824 A1 | 4/2013 |
| WO | WO 2013052824 | | 4/2013 |
| WO | | 2016010097 A1 | 1/2016 |
| WO | WO2016010097 | | 6/2016 |
| WO | | 2017070605 A1 | 4/2017 |
| WO | WO 2017070605 | | 4/2017 |
| WO | | 2020237214 A1 | 11/2020 |
| WO | | 2021026083 A1 | 2/2021 |
| WO | | 2021071756 A1 | 4/2021 |
| WO | | 2022010503 A1 | 1/2022 |
| WO | | 2022010544 A1 | 1/2022 |
| WO | | 2022035464 A1 | 2/2022 |
| WO | | 2022098381 A1 | 5/2022 |

OTHER PUBLICATIONS

Fromm et al., "A Vector Space model for Neural Network Functions: Inspirations from Similarities between the Theory of Connectivity and the Logarithmic Time Course of Word Production", Frontiers in Systems Neuroscience, Aug. 28, 2020, 10 pages.

O'Hara, U.S. Appl. No. 17/090,014, filed Nov. 5, 2020, Notice of Allowance, dated Jan. 15, 2021.

Park et al., "FlavorGraph: a large-scale food-chemical grpah for generating food representations and recommending food pairings", Scientific Reports: nature Research, vol. 11, Jan. 13, 2021, 13 pages.

Yuan et al., "An Inductive Content-Augmented Network Embedding Model for Edge Artificial Intelligence", IEEE Transaction on Industrial Informatics, vol. 15 No. 7, Jul. 2019, pp. 4295-4305.

Hodgkin, "The Castlemaine Project: Development of an AI-based Drug Design Support System", Molecular Modelling and Drug Design, 1994, pp. 137-169.

Peiretti et al., "Artificial Intelligence: The Future for Organic Chemistry?", ACS Omega, 2018, 3 (10), pp. 13263-13266.

Hahladakis et al., "An Overview of Chemical Additives Present in Plastics: Migration, Release, Fate and Environmental Impact During Their Use, Disposal and Recycling", Journal of Hazardous Materials 344 (2018), pp. 179-199.

The International Searching Authority, "Corrected Search Report" in application No. PCT/US2021/015462, dated Mar. 18, 2021, 5 pages.

Yang et al., "Obtaining information about protein secondary structures in aqueous solution using Fourier transform IR spectroscopy", Published online Feb. 5, 2015, nature protocols, 16 pages.

XGBoost, "Python Package Introduction", https://xgboost.readthedocs.io/en/latest/python/python_intro.html, last viewed on Nov. 5, 2020.

Wilcox et al., "Determination of Protein Secondary Structure from Infrared Spectra Using Partial Least-Squares Regression", dated 2016 American Chemical Society, 9 pages.

Sigma-Aldrich, "IR Spectrum Table and Chart", https://www.sigmaaldrich.com/technical-documents/articles/biology/ir-spectrum-table.html, last viewed on Nov. 5, 2020, 6 pages.

SciPy.org, "scipy.signal.savgol_filter", https://docs.scipy.org/doc/scipy/reference/generated/scipy.signal.savgol_filter.html, last viewed on Nov. 5, 2020, 3 pages.

SciPy.org, "scipy.integrate.simps", https://docs.scipy.org/doc/scipy/reference/generated/scipy.integrate.simps.html, last viewed on Nov. 5, 2020, 2 pages.

Scikitlearn.org, "sklearn.neighbors.KNeighborsRegressor", https://scikit-learn.org/stable/modules/generated/sklearn.neighbors.KNeighborsRegressor.html, last viewed on Nov. 5, 2020, 5 pages.

Scikitlearn.org, "sklearn.model_selection.GridSearchCV", https://scikit-learn.org/stable/modules/generated/sklearn.model_selection.GridSearchCV.html, last viewed on Nov. 5, 2020, 7 pages.

Scikitlearn.org, "sklearn.linear_model.Lasso", https://scikit-learn.org/stable/modules/generated/sklearn.linear_model.Lasso.html, last viewed on Nov. 5, 2020, 6 pages.

Scikitlearn.org, "sklearn.cross_decomposition.PLSRegression", https://scikit-learn.org/stable/modules/generated/sklearn.cross_decomposition.PLSRegression.html, last viewed on Nov. 5, 2020, 5 pages.

Scikitlearn.org, "3.2.4.1.3. sklearn.linear_model.LassoCV", https://scikit-learn.org/stable/modules/generated/sklearn.linear_model.LassoCV.html, last viewed on Nov. 5, 2020, 6 pages.

ProDry, "DSSP Tools", http://prody.csb.pitt.edu/manual/reference/proteins/dssp.html, last viewed on Nov. 5, 2020, 2 pages.

Kieaibi E., "Determination of Protein Secondary Structure from Infrared Spectra Using Partial Least-Squares Regression", dated 2016, 9 pages.

GitHub, "CMBI/DSSP", https://github.com/cmbi/dssp, last viewed on Nov. 5, 2020. 4 pages.

The International Searching Authority, "Search Report" in application No. PCT/US2021/015462, dated Mar. 18, 2021, 7 pages.

(56) References Cited

OTHER PUBLICATIONS

Current Claims in application No. PCT/US2021/015462, dated Mar. 18, 2021, 6 pages.

Zou et al., "Regularization and Variable Selection via the Elastic Net", Department of Statistics, Stanford University, dated Dec. 5, 2003, 29 pages.

Bowman et al., "Generating Sentences from a Continuous Space", May 2016.

Rudinger et al., Skip-Prop: Representing Sentences with One Vector Pre Proposition, 12th International Conference on Computational Semantics, dated 2017, 7 pages.

Karamanolakis et al., "Item Recommendation with Variational Autoencoders and Heterogeneous Priors", DLRS, dated Oct. 2018, 5 pages.

Eating bird food, "Vegan "Chicken" Salad", https://www.eatingbirdfood.com/simple-vegan-mock-chicken-salad/, Apr. 5, 2017, downloaded Mar. 11, 2021. (Year: 2017).

Rong, Xin. word2vec Parameter Learning Explained. arXiv:1411.2738v4 [cs.CL] Jun. 5, 2016. (Year: 2016).

Salvador, Amaia, et al. "Learning cross-modal embeddings for cooking recipes and food images." Proceedings of the IEEE conference on computer vision and pattern recognition. 2017. (Year: 2017).

David Xu, "Machine Learning for Flavor Development," Bachelor's Thesis, Harvard College, School of Engineering and Applied Sciences, Apr. 5, 2019, 69 pages.

Hattab et al., Application of an Inverse Neural Network Model for the Identification of Optimal Amendment to Reduce Copper Toxicity in Phytoremediated Contaminated Soils, Journal of Geochemical Exploration, Elsevier, 2014, 136, pp. 14-23, 2014. (Year: 2014).

Kieaibi E., Determination of Protein Secondary Structure from Infrared Spectra Using Partial Least-Squares Regression, 9 pages, 2016 (Year: 2016).

XGBoost, "Python Package Introduction", https://xgboost.readthedocs.io/en/latest/python/python_intro.html, last viewed on Nov. 5, 2020, 5 pages.

GitHub.com, "CMBI/DSSP", https://github.com/cmbi/dssp, last viewed on Nov. 5, 2020. 4 pages.

Cao et al.,"Optimization of Formulations Using Robotic Experiments Driven by Machine Learning DoE", Cell Reports Physical Science, Jan. 20, 2021, 17 pages.

International Searching Authority, "Search Report" in application No. PCT/US2021/015462, dated Mar. 18, 2021, 6 pages.

United States Patent Office, "Notice of Allowance", in U.S. Appl. No. 17/090,014, dated Jan. 15, 2021, 19 pages.

Paul, Rahl, "Classifying Cooking Object's State using a Tuned VGG Convolutional Neural Netwrok," May 2018, 5 pages.

* cited by examiner

FIG. 4    400

402 Collecting first digital data representing FTIR spectra of a plurality of ingredients and second digital data representing secondary structures of the plurality of ingredients 404 Transforming the first digital data representing the FTIR spectra to obtain third digital data representing quantized FTIR spectra 406 Creating a training data set for use in training an artificial intelligence model, the training set including the second digital data representing the secondary structures of the plurality of ingredients and the third digital data representing the quantized FTIR spectra 408 Training, using the training data set, the artificial intelligence model to obtain a set of hyperparameters of the artificial intelligence model 410 Obtaining fourth digital data representing FTIR spectrum of the specific ingredient 412 Applying the trained artificial intelligence model, configured with the set of hyperparameters, to the fourth digital data representing the FTIR spectrum of the specific ingredient to generate fifth digital data representing the predicted protein secondary structure of the specific ingredient

PROTEIN SECONDARY STRUCTURE PREDICTION

BENEFIT CLAIM

This application is a continuation of U.S. non-provisional application Ser. No. 17/090,014, filed Nov. 5, 2020, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

One technical field of the present disclosure is artificial intelligence, as applied to proteins. The disclosure relates, in particular, to use of artificial intelligence to predict protein secondary structures.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The understanding of protein structures is a cornerstone in many research fields, including in the fields of medicine, pharmaceuticals, and food science. Protein structures aid in the understanding of how proteins function. One can determine how molecules will bind to proteins or determine which proteins have similar functional behavior, for example. Protein structure prediction is an inference of the structure or 3-D shape of a protein from its amino acid sequence. However, predicting the shape of a protein is challenging because proteins are composed of different amino acids that combine and can form into one of trillions of shapes. Computational methods have made great advances in making such predictions. Yet, these techniques are limited in scale and scope of the proteins that can be predicted. In particular, predictions are often made using FTIR (Fourier Transform Infrared Spectroscopy) data, a nondestructive, time- and cost-effective measurement. This is less effective than taking precise measurements from tools such as X-Ray crystallography or determining the full amino acid sequence, but is more practical. A common technique for predicting protein structure from FTIR involves manual curve fitting, an error-prone and time-consuming process. Attempts to automate prediction using machine learning models, such as partial least squares regression, have been attempted but have been limited by the availability of supervised data sets including FTIR and protein structure information. These limitations lead to questions of model generalizability and robustness.

Accordingly, there is a need for a new and nonobvious technique to infer or predict protein shapes using artificial intelligence.

SUMMARY

The appended claims may serve as a summary of the invention.

BRIEF DESCRIPTION OF THE FIGURES

The present invention is illustrated by way of example, and not by way of limitation, in the figures of the accompanying drawings and in which like reference numerals refer to similar elements and in which:

FIG. 4 illustrates an example method to predict a protein secondary structure of a specific ingredient, in accordance with some embodiments.

DETAILED DESCRIPTION

Figure 1:
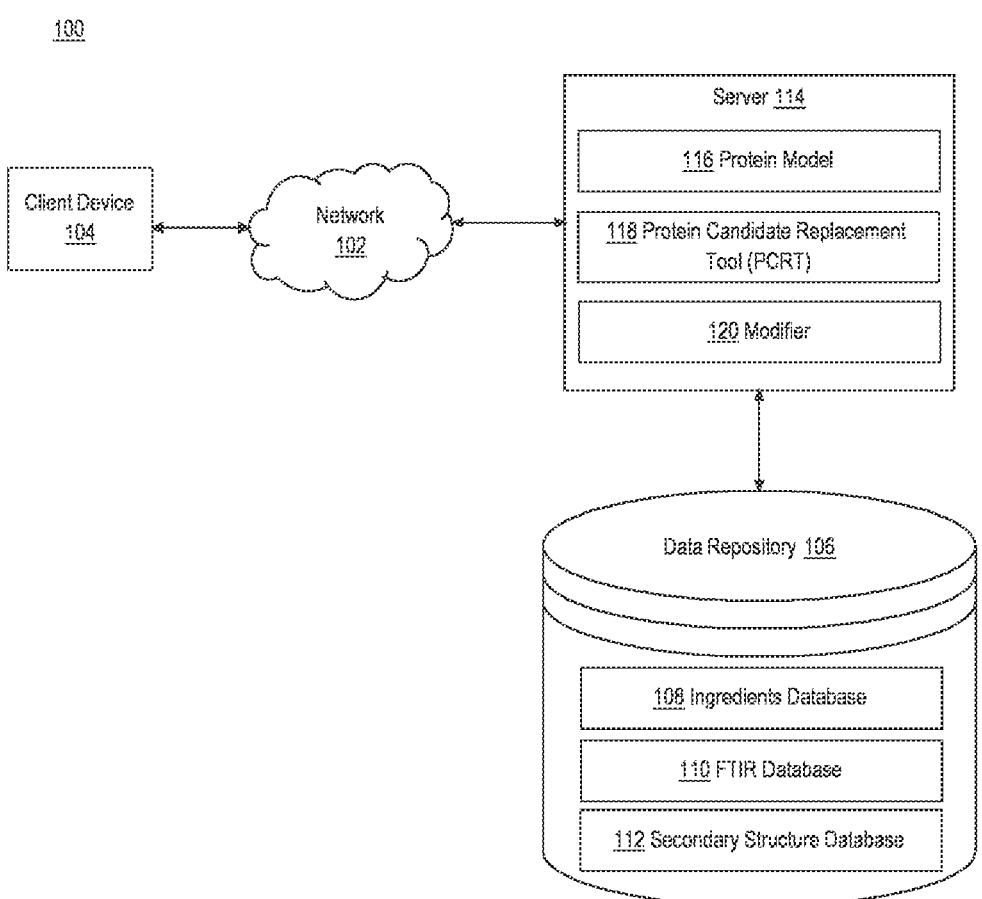
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
2.0 PROTEIN BACKGROUND
3.0 STRUCTURAL OVERVIEW
4.0 FUNCTIONAL OVERVIEW
   1.1 MODIFIER
   1.2 PROTEIN MODEL
   1.3 PROTEIN CANDIDATE REPLACEMENT TOOL
2.0 METHOD FOR PROTEIN SECONDARY STRUCTURE PREDICTION
3.0 HARDWARE OVERVIEW
4.0 SOFTWARE OVERVIEW
5.0 OTHER ASPECTS OF DISCLOSURE 1.0 General Overview An artificial intelligence model receives a FTIR (Fourier Transform Infrared Spectroscopy) spectrum of a given ingredient to predict its protein secondary structure. The model includes three artificial modules, which generate three predicted values corresponding to structural categories (e.g., α-helix, β-sheet, and other) of the predicted secondary structure. Proteins may be compared for similarity based on predicted values corresponding to the structural categories of the predicted secondary structure.

In one aspect, a computer-implemented method of predicting a protein secondary structure of a specific ingredient, the method comprising. The method comprises collecting first digital data representing FTIR spectra of a plurality of ingredients and second digital data representing secondary structures of the plurality of ingredients, transforming the first digital data representing the FTIR spectra to obtain a third digital data representing quantized FTIR spectra, and creating a training data set for use in training an artificial intelligence model, the training set including the second digital data representing the secondary structures of the FTIR spectra and the third digital data representing the quantized FTIR spectra. The method also includes training, using the training data set, the artificial intelligence model, in a first stage, to obtain a set of hyperparameters of the artificial intelligence model by matching the plurality of the second digital data representing the secondary structures with the plurality of third digital data representing the quantized FTIR spectra. In an embodiment, the artificial intelligence model comprises three artificial intelligence components, each of the three artificial intelligence components generating a particular value representing a particular aspect of a particular secondary structure of a particular ingredient. The method also includes obtaining fourth digital data representing FTIR spectrum of the specific ingredient, and applying the trained artificial intelligence model having the set of hyperparameters to the fourth digital data representing the FTIR spectrum of the specific ingredient, in a second stage, to generate fifth digital data representing the predicted protein secondary structure of the specific ingredient.

Other embodiments, aspects, and features will become apparent from the reminder of the disclosure as a whole.

2.0 Protein Background

Fourier Transform Infrared Spectroscopy (FTIR) is a scientific method of generating a "chemical fingerprint" of a sample. Infrared radiation (IR) is applied to the sample and the sample's absorbance of infrared light at various wavelengths is measured, using a FTIR spectrometer, to determine its molecular composition (e.g., "chemical fingerprint"). Values of infrared absorbance are recorded for wavenumbers between 400 $cm^{-1}$ and 4000 $cm^{-1}$. Absorbance values are plotted against wavenumbers to obtain a true FTIR spectrum of the sample.

A FTIR spectrum of a sample contains nine amide bands, including Amide I and Amide II bands or regions. Amide I and Amide II bands contain information on the secondary structure of the sample. The secondary structure represents a 3-D "shape" of the protein, which is defined by patterns of hydrogen bonds along the polypeptide backbone. Amide I band IR absorption ranges from 1600 $cm^{-1}$ and 1700 $cm^{-1}$. Amide II band IR absorption ranges from 1480 $cm^{-1}$ and 1600 $cm^{-1}$.

The protein structure is a sequence of secondary structure elements that facilitate the folding into a 3-D structure. Two most common secondary structural elements are $\alpha$-helix, $\beta$-sheet. Other secondary structural elements include turns and coils.

Techniques described herein group these elements into three structure categories: $\alpha$-helix, $\beta$-sheet, and other. The techniques determine the percentages of the sequence corresponding to structure elements of each of the three structure categories (e.g., "40% $\alpha$-helix, 50% $\beta$-sheet, and 10% other") to describe a protein's secondary structure. The percent breakdowns of the three structure categories may be determined by the relative area under the curve corresponding to the Amide I and Amide II bands.

3.0 Structural Overview

FIG. 1 illustrates an example networked computer system 100 with which various embodiments may be practiced. FIG. 1 is shown in simplified, schematic format for purposes of illustrating a clear example and other embodiments may include more, fewer, or different elements. FIG. 1, and the other drawing figures and all of the description and claims in this disclosure, are intended to present, disclose and claim a technical system and technical methods comprising specially programmed computers, using a special-purpose distributed computer system design and instructions that are programmed to execute the functions that are described. These elements execute functions that have not been available before to provide a practical application of computing technology to the problem of generating protein candidates.

In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In some embodiments, the networked computer system comprises a client device(s) 104, a server computer 114, a data repository(ies) 106, which are communicatively coupled directly or indirectly via one or more networks 102.

The server computer 114 utilizes a set of one or more computer programs or sequences of program instructions that implement machine learning algorithms to predict secondary structures of proteins and that implement algorithms to generate one or more candidate proteins to replace a given protein based on functional similarity. In an embodiment, the server computer 114 broadly represents one or more computers, such as one or more desktop computers, server computers, a server farm, a cloud computing platform (like Amazon EC2, Google Cloud), container orchestration (Kubernetes, Docker, etc.), or a parallel computer, virtual computing instances in public or private datacenters, and/or instances of a server-based application.

The server 114 comprises a protein model 116, a protein candidate replacement tool (PCRT) 118, and a modifier 120. The components of the server 114 may be implemented using software, hardware, firmware, or a combination thereof. In one embodiment, each of the protein model 116, the PCRT 118, and the modifier 120 comprises one or more sequences of computer program instructions that are programmed to execute the functions that are described herein for the foregoing elements. In an embodiment, one or more components of the server 114 may include a processor configured to execute instructions stored in a non-transitory computer readable medium.

In an embodiment, the protein model 116, including one or more artificial intelligence models, is programmed to predict a secondary structure of a sample (e.g., a protein) based on its FTIR spectrum. The protein model 116 may use a plurality of sub-models, where predictions from the plurality of sub-models are input into stacking ensemble regressors to predict percentage values of different types or categories of structures that represent or describe the secondary structure of the protein. In an embodiment, the protein model 116 outputs a predicted tuple of values corresponding to three structure categories of $\alpha$-helix, $\beta$-sheet, and other (e.g., turns, coils).

In an embodiment, the PCRT 118 is programmed to receive an input, such as from a client device 104, indicating a selected protein as a target for replacement and to generate, based on the input, one or more protein candidates from a plurality of proteins that have functional similarities to the selected protein. The protein candidates that have functional similarities with the selected protein may be determined based on either comparisons of corresponding FTIR spectra or comparisons of corresponding secondary structures. The protein candidates for the selected protein may be returned as results to the client device 104 for display.

In an embodiment, the modifier 120 is programmed to transform or modify one form of FTIR spectra to another. For example, the modifier 120 may transform true FTIR spectra into corrected FTIR spectra, from corrected FTIR spectra into quantized FTIR spectra for use by the protein model 116, and from corrected FTIR spectra into normalized FTIR spectra for use by the PCRT 118.

In some embodiments, in keeping with sound software engineering principles of modularity and separation of function, the protein model 116 and the PCRT 118 are implemented as a logically separate program, process or library.

Computer executable instructions described herein may be in machine executable code in the instruction set of a CPU and may have been compiled based upon source code written in PYTHON, JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server 114.

The server 114 may be coupled to the data repository 106 that includes an ingredients database 108, a FTIR database 110, and a secondary structure database 112.

The ingredients database 108 includes raw ingredients. An ingredient may be plant-based, animal-based, water-based, synthetic, or a combination thereof. Some non-limiting examples of plant-based ingredients may include vegetables (e.g., onions, potatoes, garlic, spinach, carrots, celery, squash, etc.), fruits (e.g., apples, pears, grapes, etc.), herbs (e.g., oregano, cilantro, basil, etc.), spices (e.g., black peppers, turmeric, red chili peppers, cinnamon, etc.), oils (e.g., corn oil, olive oil, etc.), nuts (e.g., almonds, walnuts, pistachios, etc.), legumes (e.g., lentils, dried peas, soybeans, etc.), starch, proteins, fibers, carbohydrates, sugar, etc. Some non-limiting examples of animal-based ingredients may include dairy products (e.g., milk, butter, cheese, yogurt, ice cream, etc.), egg-based products (e.g., mayonnaise, salad dressings, etc.), meat products (e.g., burger patties, sausages, hot dogs, bacon, etc.), and/or seafood (e.g., fish, crab, lobsters, etc.). Synthetic ingredients may include artificially produced food, e.g., artificial meats, artificial sweeteners, artificial milk, etc. An ingredient may be primarily composed of protein.

In an embodiment, each ingredient in the ingredients database 108 may be associated with true FTIR data, corrected FTIR data, quantized FTIR data, and normalized FTIR, which may be stored with the ingredients in the ingredients database 108 or separately from the ingredients in a FTIR database 110. The quantized FTIR data may be used by the protein model 116, while the normalized FTIR data may be used by the PCRT 118.

In an embodiment, each ingredient in the ingredients database 108 may be associated with secondary structure. The secondary structure of an ingredient may be a known secondary structure. Alternatively, the secondary structure of an ingredient may be inferred or predicted from FTIR spectra, using the protein model 116. The secondary structure may be represented as a tuple of values corresponding to three structure categories of $\alpha$-helix, $\beta$-sheet, and other (e.g., coils and turns). Secondary structure data may be stored with the ingredients in the ingredients database 108 or separately from the ingredients in a secondary structure database 112.

The data repository 106 may include other databases storing proprietary data (e.g., gas chromatography, texturometer, physiochemical (viscosity, pH, etc.), and other features), relating to each ingredient in the ingredients database 108, and other information that may be used by the server 114. Each database 108, 110, 112 may be implemented using memory, e.g., RAM, EEPROM, flash memory, hard disk drives, optical disc drives, solid state memory, or any type of memory suitable for database storage.

The network 102 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 102 and the disclosure presumes that all elements of FIG. 1 are communicatively coupled via the network 102. The various elements depicted in FIG. 1 may also communicate with each other via direct communications links that are not depicted in FIG. 1 for purposes of explanation.

The server 114 is accessible over the network 102 by multiple computing devices, such as a client device 104, to request one or more protein candidates based on a given protein to replace. The client device 104 may comprise a desktop computer, laptop computer, tablet computer, smartphone, or any other type of computing device that allows access to the server 114. The elements in FIG. 1 are intended to represent one workable embodiment but are not intended to constrain or limit the number of elements that could be used in other embodiments.

4.0 Functional Overview

In an embodiment, the modifier 120, the protein model 116, and the PCRT 118 interoperate programmatically in an unconventional manner to predict secondary structures of proteins and to generate one or more protein candidates for a given protein based on similarities of FTIR data of proteins or based on similarities of secondary structures of proteins.

4.1 Modifier

The modifier 120 transforms or modifies one form of FTIR spectra to another. For example, the modifier 120 may transform true FTIR spectra into corrected FTIR spectra. Infrared absorbance measurements may be collected using a FTIR spectrometer. For each sample (e.g., ingredient), measurements of infrared absorbance for wavenumbers between 400 cm$^{-1}$ and 4000 cm$^{-1}$ are collected. A common error in recording a true FTIR spectrum is what is referred to as a "sloping baseline," in which the FTIR values become increasingly overestimated or underestimated as the wavenumber increases. To correct this error, the modifier 120 processes all true FTIR spectra with rubber band baseline correction or another suitable correction technique. Rubber band baseline correction fits a curve "stretched around" the bottom of a true FTIR spectrum, then subtracts that curve from the true FTIR spectrum to mitigate the error, resulting in a corrected FTIR spectrum.

The corrected FTIR spectra may be used by the protein model 116 and the PCRT 118. Alternatively, different forms of the corrected FTIR spectra may be used by the protein model 116 and the PCRT 118. The modifier 120 may also transform the corrected FTIR spectra into quantized FTIR spectra for use by the protein model 116 and into normalized FTIR spectra for use by the PCRT 118.

For example, depending on how the true FTIR data was obtained (e.g., sampling rate), the corrected FTIR data may not be usable by the protein model 116 as the protein model 116 may have a specific input resolution domain. Corrected FTIR data of proteins have absorbance values corresponding to wavenumbers between 400 cm$^{-1}$ and 4000 cm$^{-1}$ but may be of varying resolutions. To use the corrected FTIR data in the protein model 116, the modifier 120 quantizes the data to fit into an input resolution domain of the protein model 116, which expects a consistent input resolution. The corrected FTIR data may be upsampled or downsampled such that they match the input resolution domain of and can thus be interpreted by the protein model 116. As in illustration, certain wavenumbers of a sample may not be available (e.g., due to different sampling rate used to obtain absorbance values) but are required by the protein model 116. Those wavenumbers must be imputed before the data can be used by the protein model 116. In an embodiment, the modifier 120 may use a KNeighborRegessor to impute these values with a distance-weighted average of the nearest points in the true FTIR signal to that wavenumber. A new absorbance spectrum is obtained by predicting with the KNeighborRegressor on the set of wavenumbers used to train the regressor (e.g., 1000 cm$^{-1}$ to 1900 cm$^{-1}$, at 1 cm$^{-1}$ intervals). This provides a quantized spectrum, which is then smoothed using a 15-point Savitzky-Golay Filter.

For another example, absorbance values may vary within samples of the same substance if physical conditions or concentrations are different. The relative absorbance values will be the same. As such, the "shape" of a FTIR spectrum is more important than the magnitude of its peaks. Two spectra that share the exact same shape, but which might, for example, have absorbance values that differ by a multiplicative factor of two, are likely to come from the same compound. Without losing information, the modifier 120 normalizes each spectrum, using integral approximation, such that the area under the curve is equal to one. Normalization may be performed on the entire spectrum, the Amide I band of the spectrum, the Amide II band of spectrum, and both the Amide I and II regions of the spectrum.

In an embodiment, the modifier 120 may apply a Savitzky-Golay Filter to smooth the corrected spectra prior to normalization or quantizing. This filter attempts to correct for the noise added during the previous imputation step. For each discrete value in the signal, a local polynomial is fit over all points in the original spectrum within a chosen window size, centered at that value. The value is replaced with its corresponding function value in the polynomial fit. The resulting spectrum preserves the tendency of the original spectrum while reducing the impact of noise. In an embodiment, the window size is chosen to be 15, due to the fact that the protein model 116 input is quantized to a resolution of one point per cm$^{-1}$, and a range of 15 cm$^{-1}$ is large enough to encompass the half-bandwidth at half-height for most Amide I peaks corresponding to protein structural elements.

4.2 Protein Model

During a prediction stage, the protein model 116 receives a sample's full FTIR spectrum as input and returns a predicted tuple of values corresponding to three structure categories of α-helix, β-sheet, and other (e.g., coils and turns). The sample may be an ingredient, from the ingredients database 108, for which there is no known secondary structure. The FTIR spectrum may be a quantized FTIR spectrum and may be accessed from the ingredients database 108 or FTIR database 110. The sample may be a dehydrated protein. The tuple of three values generated and output by the protein model 116 represent a predicted secondary structure that describes the 3-D shape of the protein.

Figure 2:
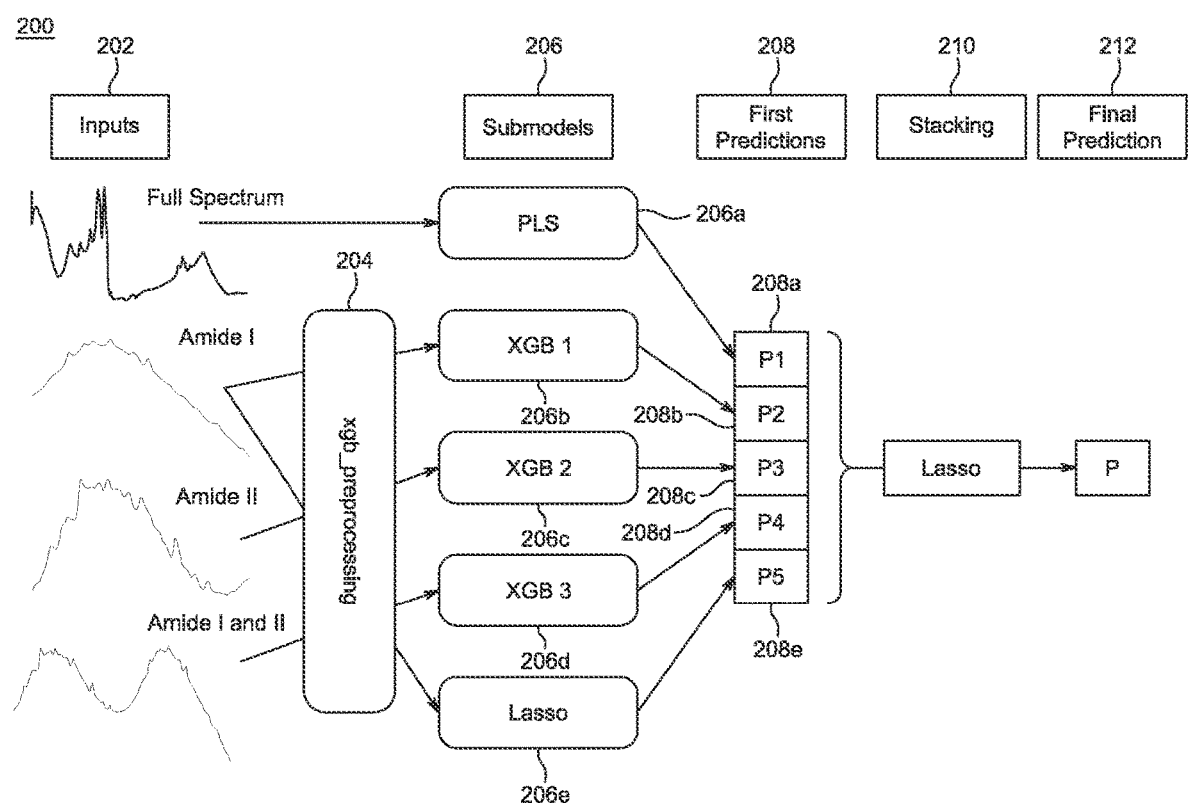
FIG. 2 illustrates an example module of a protein model in accordance with some embodiments.

In an embodiment, the protein model 116 includes three artificial intelligence modules each outputs a predicted value corresponding to one of three structure categories (e.g., α-helix, β-sheet, and other). FIG. 2 illustrates an example module 200 of the protein model 116 in accordance with some embodiments. An input to the module is a full quantized FTIR spectrum of a sample. The module 200 includes five sub-models 206 and a stacking ensemble regressor 210. Each of the sub-models 206 may be applied to the entire spectrum or a particular region(s) of the spectrum.

In an embodiment, the five sub-models 206 include a Partial Least Squares Regression sub-model 206a, three gradient boost tree sub-models 206b, 206c, 206d, and a Lasso Regression sub-model 206e. The Partial Least Squares Regression sub-model 206a is applied to the full quantized FTIR spectrum to generate a first predicted value 208a. The gradient boosted tree sub-models 206b, 206c, 206d can be implemented using XGBoost. The XGBoost sub-model 206b is applied to the Amide I band of the quantized FTIR spectrum to generate a first predicted value 208b. The XGBoost sub-model 206c is applied to the Amide II band of the quantized FTIR spectrum to generate a first predicted value 208c. The XGBoost sub-model 206d is applied to both the Amide I and Amide II bands of the quantized FTIR spectrum to generate a first predicted value 208d. The Lasso regression sub-model 206e is applied to the Amide I band of the quantized FTIR spectrum to generate a first predicted value 208e.

In an embodiment, the XGBoost sub-models 206b, 206c, 206d and the Lasso Regression sub-model 206e are applied to preprocessed Amide I and Amide II bands. A preprocessor 204 (shown as "xgb_preprocessing" in FIG. 2) takes as input an absorbance spectrum (any region such as Amide I region and/or Amide II region), applies a second-order 15-point Savitzky-Golay filter to approximate a second derivate of the spectrum, and normalizes the sum of points to one. The region is split into equally-sized intervals, each being 10% of the input region. The integral under the processed spectrum is approximated for each interval using Simpson's Rule. Those ten integral values are the new processed model input. In the Amide bands, relative areas under the curve of certain peaks correspond to relative concentrations of secondary structures. The preprocessor 204 is configured to approximately model this relationship. The ten areas under the curve are newly-engineered features used to represent that region of the spectrum in the sub-model 206b, 206c, 206d, 206e.

The XGBoost sub-model 206d provides a different level of granularity of the Amide I and Amide II bands because, when the xgb_preprocessing is applied to both bands together, the approximate integrals represent a larger range of wavenumbers than in either of the specific Amide bands. The XGBoost sub-model 206d that is applied to both Amide I and Amide II bands thus provides a higher-level view of these bands than those provided by the XGBoost sub-models 206b, 206c alone.

First prediction values 208 from the five sub-models 206 are input into a final lasso regression model 210, which serves as a stacking ensemble regressor. The stacking ensemble regressor 210 predicts a final prediction value for a corresponding structure category (e.g., α-helix, β-sheet, or other).

For all three structure categories, independent sub-models are trained during a training stage, using a proprietary training data set. In an embodiment, the training data set includes FTIR spectra of 82 protein isolate samples with known secondary structures and having absorbance values at infrared wavenumbers between 1000 cm$^{-1}$ and 1900 cm$^{-1}$, at 1 cm$^{-1}$ intervals. The known secondary structures were obtained using DSSP analysis with PDB (protein database) code attributed to each sample. The DSSP analysis returned, for each protein, a sequence of secondary structure substructures having eight labels (e.g., G, H, I, B, E, S, T, and C) and corresponding measures. The labels were then consolidated into three structure categories representing α-helix, β-sheet, or other, by taking the percentages of the sequence corresponding to elements of each of the three categories. An 80/20 training-test split is used to train the models, but the same initial random state was used for each split of the data set. The training data set may be stored with other data in the data repository 106 and may be used by the PCRT 118. In an embodiment, spectra of all data, including the training data, are first processed with rubber band baseline correction. The spectra of the training data may also be quantized.

Each sub-model 206 may be trained using a grid search 5-fold cross validation over its respective parameter space to find the optimal hyperparameters by mean squared error. In an embodiment, GridSearchCV may be used to find hyperparameters that minimized cross validation error. Table 1 shows example parameters that may be searched over during the training stage.

TABLE 1

| Partial Least Squares Regression Sub-Model | Number of components (between 1 and 9) |
| --- | --- |
| XGBoost Sub-Models | Maximum tree depth (2-8), Learning rate (0.01 to 0.1, counting by 0.025), percent of points in each subsample (80% to 100% counting by 5%), regularization constant gamma (from 0, 1, 5) |
| Lasso Regression Sub-Model | Alpha regularization constant between 0 and 1 by 0.1 |

The protein model 116 may be configured with final or selected hyperparameters prior to the prediction stage. Table 2 shows example final parameters that can be used to configure the protein model 116 prior to using it to predict or infer secondary structures.

TABLE 2

| | |
| --- | --- |
| Module for α-helix | PLS: n_components = 1<br>XGB Amide I: base_score = 0.5, booster = 'gbtree', colsample_bylevel = 1, colsample_bynode = 1, colsample_bytree = 1, gamma = 0, gpu_id = −1, importance_type = 'gain', interaction_constraints = '', learning_rate = 0.035, max_delta_step = 0, max_depth = 2, min_child_weight = 1, missing = nan, monotone_constraints = '( )', n_estimators = 100, n_jobs = 0, num_parallel_tree = 1, random_state = 0, reg_alpha = 0, reg_lambda = 1, scale_pos_weight = 1, subsample = 1.0000000000000002, tree_method = 'exact', validate_parameters = 1, verbosity = None<br>XGB Amide II: base_score = 0.5, booster = 'gbtree', colsample_bylevel = 1, colsample_bynode = 1, colsample_bytree = 1, gamma = 0, gpu_id = −1, importance_type = 'gain', interaction_constraints = '', learning_rate = 0.035, max_delta_step = 0, max_depth = 2, min_child_weight = 1, missing = nan, monotone_constraints = '( )', n_estimators = 100, n_jobs = 0, num_parallel_tree = 1, random_state = 0, reg_alpha = 0, reg_lambda = 1, scale_pos_weight = 1, subsample = 0.9500000000000002, tree_method = 'exact', validate_parameters = 1, verbosity = None<br>XGB Amide I and II: base_score = 0.5, booster = 'gbtree', colsample_bylevel = 1, colsample_bynode = 1, colsample_bytree = 1, gamma = 0, gpu_id = −1, importance_type = 'gain', interaction_constraints = '', learning_rate = 0.085, max_delta_step = 0, max_depth = 2, min_child_weight = 1, missing = nan, monotone_constraints = '( )', n_estimators = 100, n_jobs = 0, num_parallel_tree = 1, random_state = 0, reg_alpha = 0, reg_lambda = 1, scale_pos_weight = 1, subsample = 0.8500000000000001, tree_method = 'exact', validate_parameters = 1, verbosity = None<br>Lasso: alpha = 1<br>Stacking Lasso: alpha = 3.4906104022996015e−05 |
| Module for β-sheet | PLS: n_components = 1<br>XGB Amide I: base_score = 0.5, booster = 'gbtree', colsample_bylevel = 1, colsample_bynode = 1, colsample_bytree = 1, gamma = 0, gpu_id = −1, importance_type = 'gain', interaction_constraints = '', learning_rate = 0.060000000000000005, max_delta_step = 0, max_depth = 3, min_child_weight = 1, missing = nan, monotone_constraints = '( )', n_estimators = 100, n_jobs = 0, num_parallel_tree = 1, random_state = 0, reg_alpha = 0, reg_lambda = 1, scale_pos_weight = 1, subsample = 0.9500000000000002, tree_method = 'exact', validate_parameters = 1, verbosity = None<br>XGB Amide II: base_score = 0.5, booster = 'gbtree', colsample_bylevel = 1, colsample_bynode = 1, colsample_bytree = 1, gamma = 0, gpu_id = −1, importance_type = 'gain', interaction_constraints = '', learning_rate = 0.060000000000000005, max_delta_step = 0, max_depth = 2, min_child_weight = 1, missing = nan, monotone_constraints = '( )', n_estimators = 100, n_jobs = 0, num_parallel_tree = 1, random_state = 0, reg_alpha = 0, reg_lambda = 1, scale_pos_weight = 1, |

TABLE 2-continued

| | |
|---|---|
| | subsample = 1.0000000000000002, tree_method = 'exact', validate_parameters = 1, verbosity = None<br>XGB Amide I and II: base_score = 0.5, booster = 'gbtree', colsample_bylevel = 1, colsample_bynode = 1, colsample_bytree = 1, gamma = 0, gpu_id = −1, importance_type = 'gain', interaction_constraints = '', learning_rate = 0.060000000000000005, max_delta_step = 0, max_depth = 2, min_child_weight = 1, missing = nan, monotone_constraints = '( )', n_estimators = 100, n_jobs = 0, num_parallel_tree = 1, random_state = 0, reg_alpha = 0, reg_lambda = 1, scale_pos_weight = 1, subsample = 0.9000000000000001, tree_method = 'exact', validate_parameters = 1, verbosity = None<br>Lasso: alpha = 1<br>Stacking Lasso: alpha = 0.0009767672024111225 |
| Module for "other" | PLS: n_components = 1<br>XGB Amide I: base_score = 0.5, booster = 'gbtree', colsample_bylevel = 1, colsample_bynode = 1, colsample_bytree = 1, gamma = 0, gpu_id = −1, importance_type = 'gain', interaction_constraints = '', learning_rate = 0.01, max_delta_step = 0, max_depth = 2, min_child_weight = 1, missing = nan, monotone_constraints = '( )', n_estimators = 100, n_jobs = 0, num_parallel_tree = 1, random_state = 0, reg_alpha = 0, reg_lambda = 1, scale_pos_weight = 1, subsample = 0.9500000000000002, tree_method = 'exact', validate_parameters = 1, verbosity = None<br>XGB Amide II: base_score = 0.5, booster = 'gbtree', colsample_bylevel = 1, colsample_bynode = 1, colsample_bytree = 1, gamma = 1, gpu_id = −1, importance_type = 'gain', interaction_constraints = '', learning_rate = 0.01, max_delta_step = 0, max_depth = 2, min_child_weight = 1, missing = nan, monotone_constraints = '( )', n_estimators = 100, n_jobs = 0, num_parallel_tree = 1, random_state = 0, reg_alpha = 0, reg_lambda = 1, scale_pos_weight = 1, subsample = 1.0000000000000002, tree_method = 'exact', validate_parameters = 1, verbosity = None<br>XGB Amide I and II: base_score = 0.5, booster = 'gbtree', colsample_bylevel = 1, colsample_bynode = 1, colsample_bytree = 1, gamma = 0, gpu_id = −1, importance_type = 'gain', interaction_constraints = '', learning_rate = 0.01, max_delta_step = 0, max_depth = 8, min_child_weight = 1, missing = nan, monotone_constraints = '( )', n_estimators = 100, n_jobs = 0, num_parallel_tree = 1, random_state = 0, reg_alpha = 0, reg_lambda = 1, scale_pos_weight = 1, subsample = 0.8, tree_method = 'exact', validate_parameters = 1, verbosity = None<br>Lasso: alpha = 0.1<br>Stacking Lasso: alpha = 0.00014255314384651902 |

Output of the protein model 116 includes tuples of values describing the secondary structure of samples (e.g., ingredients). In an embodiment, the tuples are output in a format of "x % α-helix, y % β-sheet, and z % other," where x, y, and z are values adding up to 100. Predicted secondary structures may be stored with the ingredients in the ingredients database 108 or separately from the ingredients in the secondary structure database 112. Secondary structure data may be compared, such as by the PCRT 118, to determine proteins that are functionally similar.

4.3 Protein Candidate Replacement Tool

The PCRT 118 uses data stored in the data repository 106 (e.g., ingredients database 108, FTIR database 110 and/or the secondary structure database 112) to generate one or more protein candidates for a selected protein target based on similarities in corresponding FTIR spectra or based on similarities in tuple of secondary structure percentages (e.g., predicted secondary structures).

In an embodiment, similarities in the FTIR spectra may be determined by using a similarity technique, such as Cosine Similarity, Euclidean Distance, Wasserstein Distance, or Jensen-Shannon Distance. The PCRT 118 may apply a similarity technique to the FTIR spectrum of a selected protein and each of the other FTIR spectra stored in the ingredients database 108 or the FTIR database 110 to determine vector or distribution similarity metrics. The metrics or scores determined are used to output protein candidates that are the most functionally similar to the selected protein target. The FTIR spectra used by the PCRT 118 may be normalized FTIR spectra.

In an embodiment, similarities in predicted secondary structure may be determined by using a similarity technique, such as Euclidean Distance. The PCRT 118 may apply a similarity technique to a vector representation of the tuple of the secondary structure of a selected protein and the vector representation of each of the other tuples stored in the ingredients database 108 or the secondary structure database 112 to determine vector similarity metrics. The metrics or scores determined are used to output protein candidates that are the most functionally similar to the selected protein target.

Figure 3:
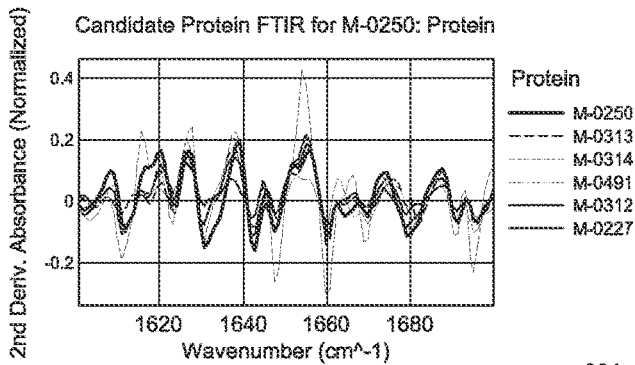
FIG. 3 illustrates an example graphical user interface of a protein candidate replacement tool in accordance with some embodiments.

FIG. 3 illustrates an example graphical user interface (GUI) 300 of the PCRT 118 in accordance with some embodiments. The GUI 300 includes a settings panel 302 and a results panel 304. The settings panel 302 includes a protein selection field 306, a wavenumber region field 308, a comparison method selection field 310, a number of results selection field 312, a resolution selection field 314, a second derivative option 316, a same plant filter 318, and a non-protein option 320.

In use, a user selects a protein sample, using the protein selection field 306, from all proteins available in the ingredients database 108 that have corresponding FTIR measurements in the FTIR database 110 and corresponding tuple of secondary structure percentages of its secondary structure in the secondary structure database 112.

The user may choose, using the wavenumber region field 308, whether to compare the entire spectra or specific region(s) of the spectra (e.g., Amid I, Amide II, or Amide I and Amide II).

The user may choose, using the comparison method selection field 310, whether protein candidate replacements are generated or selected based on similarity in the FTIR spectrum or based on similarity in tuple of secondary structure percentages.

The user may choose, using the number of results selection field 312, a number of (most similar) candidates to display in the results panel 304.

The user may choose, using the resolution selection field 314, a minimum resolution of spectra to compare. This allows the user to filter out candidates whose FTIR spectra were measured at too low a resolution to trust or to have confidence in the information given. The number is the maximum distance between absorbance measurements in units of $cm^{-1}$ (wavenumbers). In an embodiment, the maximum resolution is 8.0.

The user may choose, using the second derivative option 316, whether or not the spectra should be processed with a Savitzky-Golay second derivative filter prior to comparison. The Savitzky-Golay second derivative filter may be applied to all spectra for band-narrowing.

The user may choose, using the same plant filter 318, whether to filter out candidates which come from the same plant. For example, when the same plant filter 318 is selected, "pea protein" will not be matched with other proteins named "pea protein," "pea protein isolate," etc. This is the use case in which a scientist wants to replace a specific soy protein with another non-soy protein.

The user may choose, using the non-protein option 320, a target from all of the ingredients in the ingredients database 108, rather than just from proteins in the ingredients database 108. In an embodiment, a warning is generated to focus within the Amide regions when the non-protein option 320 is enabled.

After the user has completed their selections, the PCRT 118 accesses data stored in the data repository 106 and compares the accessed data, according to the selections made in the settings panel 302. For example, in FIG. 3, the user has selected "M-0250: Protein" in field 306, the Amide I band in field 308, the secondary structure method in field 310, the value 5 in field 312, minimum resolution of 1.9 in field 314, and enabled the second derivative option 316. Based on these selections, the server 114 accesses the secondary structure data of the selected protein (e.g., "M-0250:Protein") and compares it with the secondary structure data of other ingredients that have corresponding FTIR data with a minimum resolution of 1.90. The PCRT 118 compares the secondary structures and suggests the top five ingredients (e.g., proteins) that are functionally similar to the selected protein, based on comparison scores.

In an embodiment, if the secondary structure comparison method is selected in the method selection field 310, then the PCRT 118 does not consider other settings, such as the setting relating to wavenumber region, during a comparison. However, these settings may be used during the rendering of FTIR spectra of the proteins.

Results are shown in the results panel 304. For example, in FIG. 3, the top five protein candidates (e.g., M-0313, M-0314, M-0491, M-0312, and M-0227) are listed, with respective protein names, commercial names, and aliases, in a first area 304a of the results panel 304. In addition, FTIR spectra corresponding to the protein candidates are shown together in one graph that is rendered in a second area 304b of the results panel 304. The overlapping FTIR spectra are plotted on the same wavenumber scale, which allows the user to visually identify how functionally similar the candidates are to the selected protein. The scale corresponds to the selected wavenumber region. In an embodiment, the user may hover a cursor over a signal (e.g., spectrum) or may activate a signal to obtain more information about the corresponding protein candidate represented by the signal.

In an embodiment, protein candidates generated by the PCRT 118 may be experimented as potential substitutes in food items. Feedback based on the experiments may be used to improve the protein model 116. Improvements to the protein model 116 can be made iteratively to result in better suggestions.

5.0 Method for Protein Secondary Structure Prediction

FIG. 4 illustrates an example method 400 to predict a protein secondary structure of a specific ingredient in accordance with some embodiments. FIG. 4 may be used as a basis to code the method 400 as one or more computer programs or other software elements that a formula generator can execute or host.

At step 402, first digital data representing FTIR spectra of a plurality of ingredients and second digital data representing secondary structures of the plurality of ingredients, is collected. The plurality of ingredients, the corresponding FTIR spectra, and the corresponding secondary structures may be stored in the data repository 106. For example, the plurality of ingredients is stored in the ingredients database 108, the corresponding FTIR spectra are stored in the FTIR database 110, and the corresponding secondary structures are stored in the secondary structure database 112. In an embodiment, the FTIR spectra of the plurality of ingredients is generated from true FTIR spectra of the plurality of the ingredients, using a baseline correction technique. The true FTIR spectra may be obtained using FTIR spectroscopy techniques.

At step 404, the first digital data representing the FTIR spectra is transformed to obtain third digital data representing quantized FTIR spectra. In an embodiment, the quantized FTIR spectra is obtained by upsampling or downsampling the FTIR spectra. Step 404 is performed on those FTIR spectra that are missing data (e.g., absorbance values) due to a sampling rate used to obtain those FTIR spectra.

At step 406, a training set for use in training an artificial intelligence model is created. In an embodiment, the artificial intelligence model is the protein model 116. The training set includes the second digital data representing the secondary structures of the plurality of ingredients and the third digital data representing the quantized FTIR spectra. In an embodiment, the third digital data representing the quantized FTIR spectra fits an input resolution domain of the artificial intelligence model.

At step 408, the artificial intelligence model is trained, using the training set, in a first stage to obtain a set of hyperparameters of the artificial intelligence model. The first stage is a training stage. The artificial intelligence may model be trained by matching the plurality of the second digital data representing the secondary structures with the plurality of third digital data representing the quantized FTIR spectra.

In an embodiment, the artificial intelligence model comprises three artificial intelligence components. Each of the three artificial intelligence components generates a particular value representing a particular aspect of a particular secondary structure of a particular ingredient. The particular aspect corresponds to one of three structural categories (e.g., α-helix, β-sheet, and other).

In an embodiment, each of the three artificial intelligence components comprises a plurality of sub-models including a Partial Least Squares sub-model applied on the third digital data representing the quantized FTIR spectra, a first XGBoost sub-model applied to a first portion of the third digital data representing the quantized FTIR spectra, a second XGBoost sub-model applied to a second portion of the third digital data representing the quantized FTIR spectra, a third XGBoost sub-model applied to a combination of the first and second portions of the third digital data representing the quantized FTIR spectra, and a Lasso regression sub-model applied to the first portion of the third digital data representing the quantized FTIR spectra. The first portion of the third digital data, the second portion of the third digital data, and the combination of the first and second portions of the digital data may be preprocessed to each obtain a plurality of integral values as input to a corresponding sub-model of the plurality of sub-models.

Each of the three artificial intelligence components further comprises a stacking ensemble regressor applied on first prediction values output from the plurality of sub-models to generate the particular value representing the particular aspect of the particular secondary structure of the particular ingredient.

At step 410, fourth digital data representing FTIR spectrum of the specific ingredient is obtained. The specific ingredient has no known secondary structure.

At step 412, the trained artificial intelligence model, configured with the set of hyperparameters, is applied to the fourth digital data representing the FTIR spectrum of the specific ingredient, in a second stage, to generate fifth digital data representing the predicted protein secondary structure of the specific ingredient. The second stage is a prediction stage. In an embodiment, the fifth digital data includes a tuple of values generated by the three artificial intelligence components during the second stage. Each value in the tuple of values is a percentage of the predicted secondary structure that corresponds with elements associated with a structural group of the predicted secondary structure.

The specific ingredient and the predicated secondary structure may be stored in the data repository 106 for use by the PCRT 118. The PCRT 118 may compare proteins (and other ingredients) in the data repository 106 based on their secondary structures of the proteins or their FTIR data to determine which proteins are functionally similar based on similarity metrics or scores.

Techniques described herein speeds up research and development by suggesting proteins on which to experiment and eliminates human bias in experimentation by relying only on data for suggestions. Feedback from the experimentation is used to improve the protein model 116 by adjusting its hyperparameters. Improvements to the protein model 116 can be made iteratively to result in better suggestions. The techniques may lead to discovery of great performance from novel, unexpected proteins.

6.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
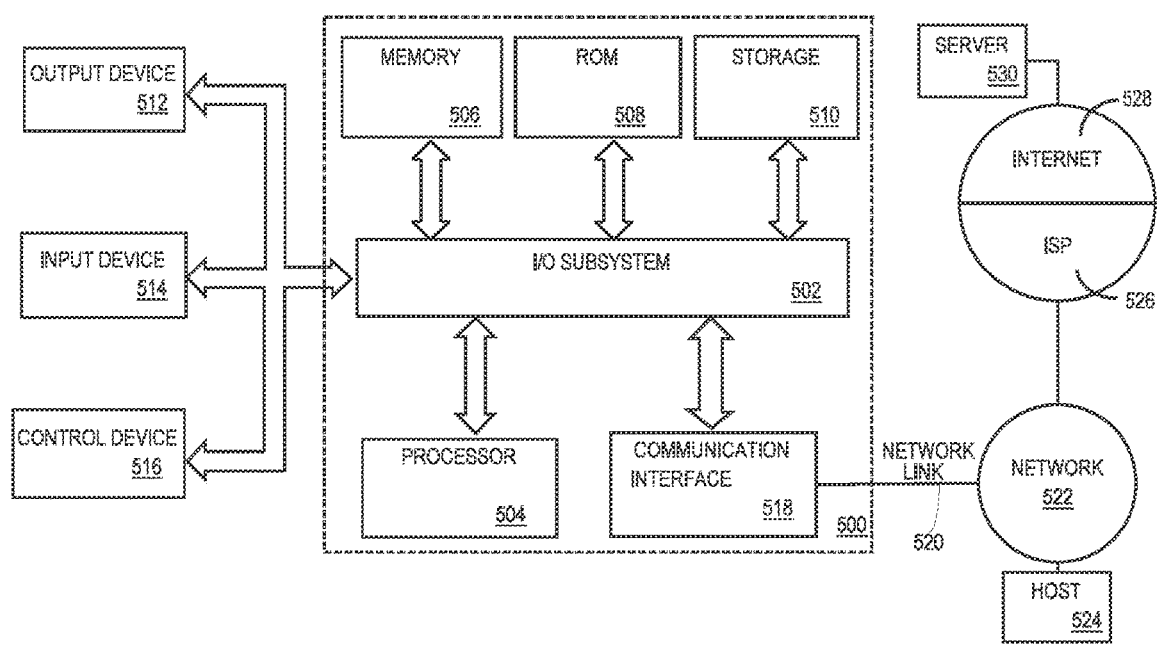
FIG. 5 illustrates a block diagram of a computing device in which the example embodiment(s) of the present invention may be embodiment.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk, or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators, or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media.

For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine, or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7.0 Software Overview

Figure 6:
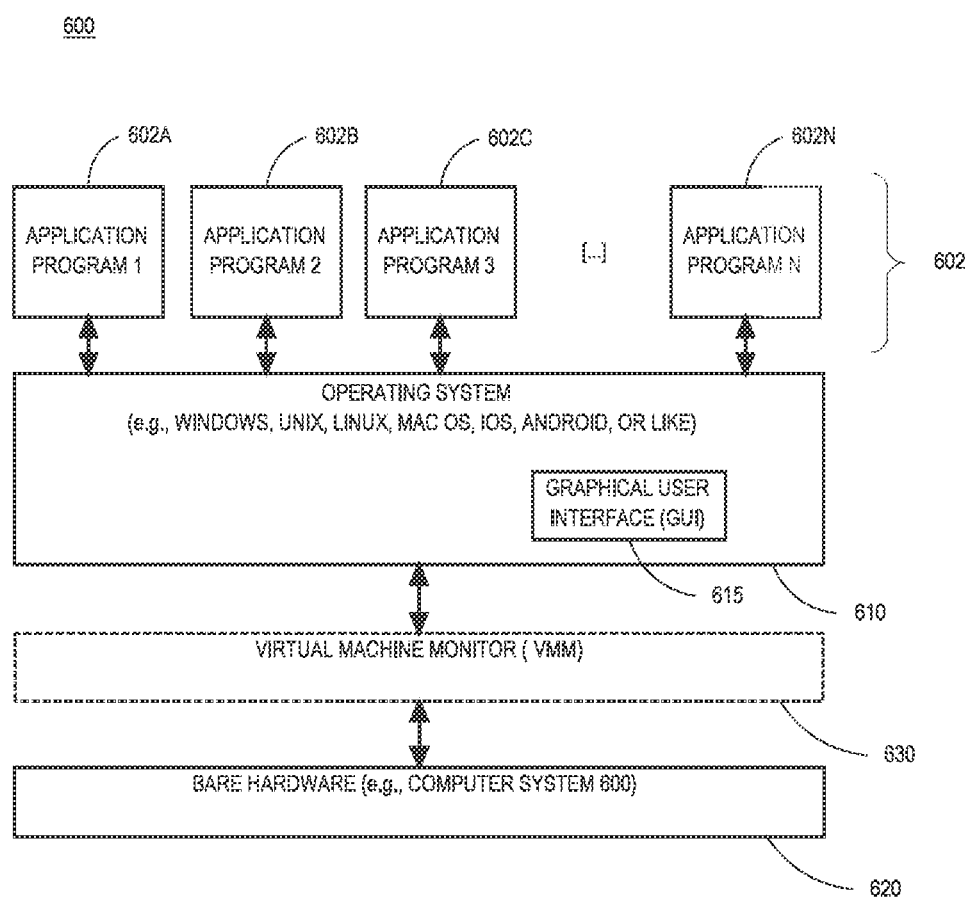
FIG. 6 illustrates a block diagram of a basic software system for controlling the operation of a computing device.

FIG. 6 is a block diagram of a basic software system 600 that may be employed for controlling the operation of computing device 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing device 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on device 600 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of device 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the device 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of device 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

8.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
receiving a request from a computing device, the request specifying a particular comparison selection from a plurality of comparison selections and identifying a particular ingredient from a plurality of ingredients;
wherein each ingredient of the plurality of ingredients is associated with:
a digitally-stored Fourier Transform Infrared Spectroscopy (FTIR) spectra of a respective ingredient, and
a digitally-stored vector representing a secondary structure of the respective ingredient;
wherein the particular comparison selection indicates one of the FTIR spectra of the particular ingredient or the vector representing the secondary structure of the particular ingredient to use for determining one or more similarity metrics between the particular ingredient and one or more other ingredients of the plurality of ingredients;

determining the one or more similarity metrics, based on at least the particular comparison selection, between the particular ingredient and the one or more other ingredient of the plurality of ingredients;

generating, based at least on the one or more similarity metrics, at least one candidate ingredient from the plurality of ingredients;

indicating the at least one candidate ingredient in a response to the request.

2. The method of claim 1, further comprising:
training an artificial intelligence model based on a training data set comprising first digital data representing FTIR spectra of particular food ingredients and second digital data representing secondary structures of the particular food ingredients;
using the trained artificial intelligence model to predict a secondary structure of a specific food ingredient.

3. The method of claim 1, wherein at least one ingredient of plurality of ingredients is applied to an artificial intelligence model to predict secondary structures of the at least one ingredient.

4. The method of claim 1, wherein the plurality of comparison selections includes a FTIR comparison and a secondary structure comparison.

5. The method of claim 1, wherein the one or more similarity metrics are determined according to one of Cosine Similarity, Euclidean Distance, Wasserstein Distance or Jensen-Shannon Distance.

6. The method of claim 1, wherein the request also identifies a particular FTIR wavelength region, wherein the one or more similarity metrics are determined based on particular FTIR wavelength regions of the particular ingredient and the one or more other ingredient of the plurality of ingredients.

7. The method of claim 1, further comprising causing to display in a graphical user interface FTIR spectra visualization of the particular ingredient and the at least one candidate ingredient.

8. One or more non-transitory computer-readable storage media storing one or more instructions programmed which, when executed by one or more computing devices, cause:
receiving a request from a computing device, the request specifying a particular comparison selection from a plurality of comparison selections and identifying a particular ingredient from a plurality of ingredients;
wherein each ingredient of the plurality of ingredients is associated with:
a digitally-stored Fourier Transform Infrared Spectroscopy (FTIR) spectra of a respective ingredient, and
a digitally-stored vector representing a secondary structure of the respective ingredient;
determining one or more similarity metrics, based on at least the particular comparison selection, between the particular ingredient and one or more other ingredient of the plurality of ingredients;
generating, based at least on the one or more similarity metrics, at least one candidate ingredient from the plurality of ingredients;
indicating the at least one candidate ingredient in a response to the request.

9. The one or more non-transitory computer-readable storage media of claim 8, further comprising:
training an artificial intelligence model based on a training data set comprising first digital data representing FTIR spectra of particular food ingredients and second digital data representing secondary structures of the particular food ingredients;
using the trained artificial intelligence model to predict a secondary structure of a specific food ingredient.

10. The one or more non-transitory computer-readable storage media of claim 8, wherein at least one ingredient of plurality of ingredients is applied to an artificial intelligence model to predict secondary structures of the at least one ingredient.

11. The one or more non-transitory computer-readable storage media of claim 8, wherein the plurality of comparison selections includes a FTIR comparison and a secondary structure comparison.

12. The one or more non-transitory computer-readable storage media of claim 8, wherein the one or more similarity metrics are determined according to one of Cosine Similarity, Euclidean Distance, Wasserstein Distance or Jensen-Shannon Distance.

13. The one or more non-transitory computer-readable storage media of claim 8, wherein the request also identifies a particular FTIR wavelength region, wherein the one or more similarity metrics are determined based on particular FTIR wavelength regions of the particular ingredient and the one or more other ingredient of the plurality of ingredients.

14. The one or more non-transitory computer-readable storage media of claim 8, further comprising causing to display in a graphical user interface FTIR spectra visualization of the particular ingredient and the at least one candidate ingredient.

15. A computing system comprising:
one or more computer systems comprising one or more hardware processors and storage media; and
instructions stored in the storage media and which, when executed by the computing system, cause the computing system to perform:
receiving a request from a computing device, the request specifying a particular comparison selection from a plurality of comparison selections and identifying a particular ingredient from a plurality of ingredients;
wherein each ingredient of the plurality of ingredients is associated with:
a digitally-stored Fourier Transform Infrared Spectroscopy (FTIR) spectra of a respective ingredient, and
a digitally-stored vector representing a secondary structure of the respective ingredient;
determining one or more similarity metrics, based on at least the particular comparison selection, between the particular ingredient and one or more other ingredient of the plurality of ingredients;
generating, based at least on the one or more similarity metrics, at least one candidate ingredient from the plurality of ingredients;
indicating the at least one candidate ingredient in a response to the request.

16. The computing system of claim 15, wherein the instructions stored in the storage media and which, when executed by the computing system, cause the computing system to further perform:
training an artificial intelligence model based on a training data set comprising first digital data representing FTIR spectra of particular food ingredients and second digital data representing secondary structures of the particular food ingredients;
using the trained artificial intelligence model to predict a secondary structure of a specific food ingredient.

17. The computing system of claim 15, wherein at least one ingredient of plurality of ingredients is applied to an artificial intelligence model to predict secondary structures of the at least one ingredient.

18. The computing system of claim 15, wherein the plurality of comparison selections includes a FTIR comparison and a secondary structure comparison.

19. The computing system of claim 15, wherein the one or more similarity metrics are determined according to one of Cosine Similarity, Euclidean Distance, Wasserstein Distance or Jensen-Shannon Distance.

20. The computing system of claim 15, wherein the request also identifies a particular FTIR wavelength region, wherein the one or more similarity metrics are determined based on particular FTIR wavelength regions of the particular ingredient and the one or more other ingredient of the plurality of ingredients.

* * * * *